United States Patent
Kitagawa

(10) Patent No.: US 11,930,142 B2
(45) Date of Patent: Mar. 12, 2024

(54) IDENTIFICATION APPARATUS, PROCESSING APPARATUS, PROCESSING METHOD, AND STORAGE MEDIUM

(71) Applicant: CANON KABUSHIKI KAISHA, Tokyo (JP)

(72) Inventor: Ryutaro Kitagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/835,327

(22) Filed: Jun. 8, 2022

(65) Prior Publication Data

US 2022/0394146 A1 Dec. 8, 2022

Related U.S. Application Data

(63) Continuation of application No. PCT/JP2020/041185, filed on Nov. 4, 2020.

(30) Foreign Application Priority Data

Dec. 19, 2019 (JP) ................................ 2019-229386

(51) Int. Cl.
H04N 1/00 (2006.01)
G06N 20/00 (2019.01)

(52) U.S. Cl.
CPC ......... H04N 1/00724 (2013.01); G06N 20/00 (2019.01); H04N 1/00729 (2013.01)

(58) Field of Classification Search
CPC . G06T 2207/10061; G06T 2207/20081; G06T 2207/20084; G06T 2207/30148;
(Continued)

(56) References Cited

U.S. PATENT DOCUMENTS 9,268,999 B2  2/2016 Xu et al.
10,810,408 B2  10/2020 Hsiung et al.
(Continued)

FOREIGN PATENT DOCUMENTS

CN  104517112 A  4/2015
JP  2018-101848 A  6/2018
JP  2019-179023 A  10/2019

OTHER PUBLICATIONS

International Search Report and Written Opinion of the International Searching Authority for International Patent Application No. PCT/JP2020/041185.

*Primary Examiner* — Negussie Worku
(74) *Attorney, Agent, or Firm* — Venable LLP

(57) ABSTRACT

An identification apparatus for identifying a type of a sheet obtains, by a sensor, a plurality of parameters including a parameter concerning a characteristic of the sheet, and identifies the type of the sheet based on a result of inputting the plurality of parameters obtained by the sensor to an estimation model obtained by machine learning using, as input data, parameters corresponding to the parameters which are obtained by the sensor and include a first parameter and a second parameter classified in accordance with whether a value tends to change due to a predetermined element, and also using, as supervised data, a type of a sheet if the parameters are obtained. The estimation model includes a first partial model to which the first parameter is input and the second parameter is not input, a second partial model to which the second parameter is input and the first parameter is not input, and a third partial model that outputs
(Continued)

a result concerning the type of the sheet based on an output from the first partial model and an output from the second partial model.

22 Claims, 13 Drawing Sheets

(58) Field of Classification Search
CPC ... G06T 7/0002; H04L 5/0044; H04L 5/0064; H04W 16/14; H04W 72/0446; H04W 72/1263; H04W 72/23; H04W 74/08; G06F 18/217; G06F 18/24143; G06V 10/764; G06V 10/776; G06V 10/82; G06V 2201/06; H01L 22/12; H01L 22/30; B41J 29/38; B65H 7/02; G01N 21/47; G03G 21/00; G06N 20/00; G06N 3/084; G06N 3/09; G06N 5/01; G06N 7/01; H04N 1/00; H04N 1/00724; H04N 1/00729
USPC ........................................................ 358/474
See application file for complete search history.

(56) References Cited

U.S. PATENT DOCUMENTS

| | | | |
|---|---|---|---|
| 11,719,727 B1* | 8/2023 | Multari | G06N 5/01 |
| | | | 702/64 |
| 2005/0074049 A1* | 4/2005 | Tanaka | G01N 25/16 |
| | | | 374/55 |
| 2007/0076074 A1* | 4/2007 | Zhang | B41J 11/009 |
| | | | 347/101 |
| 2015/0093021 A1 | 4/2015 | Xu et al. | |
| 2019/0067060 A1* | 2/2019 | Plihal | G06T 7/001 |
| 2019/0073566 A1* | 3/2019 | Brauer | G06V 10/776 |
| 2019/0236333 A1* | 8/2019 | Hsiung | G06V 20/698 |
| 2021/0034838 A1 | 2/2021 | Hsiung et al. | |
| 2021/0124986 A1* | 4/2021 | Imine | H04N 1/4406 |
| 2021/0192299 A1* | 6/2021 | Uemura | G06N 20/00 |
| 2021/0256329 A1* | 8/2021 | Ishii | B41J 11/009 |
| 2022/0138507 A1* | 5/2022 | Tanaka | G06V 10/95 |
| | | | 382/157 |
| 2022/0176715 A1* | 6/2022 | Yoshimura | B41J 15/048 |
| 2023/0339716 A1* | 10/2023 | Kitagawa | B65H 43/00 |

* cited by examiner

IDENTIFICATION APPARATUS, PROCESSING APPARATUS, PROCESSING METHOD, AND STORAGE MEDIUM

CROSS-REFERENCE TO RELATED APPLICATIONS

This application is a Continuation of International Patent Application No. PCT/JP2020/041185, filed Nov. 4, 2020, which claims the benefit of Japanese Patent Application No. 2019-229386, filed Dec. 19, 2019, both of which are hereby incorporated by reference herein in their entirety.

BACKGROUND OF THE INVENTION

Field of the Invention

The present invention relates to a sheet type identification technique.

Background Art

In order to print clearly, printers such as inkjet printers that use a mechanism for printing by causing ink permeate a sheet to be printed output ink as appropriate depending on the sheet. Hence, it is necessary to recognize the type of a sheet to be used in printing. PTL 1 Japanese Patent Laid-Open No. 2018-101848 describes a method in which when conveying a sheet in a printer, the sheet is illuminated with light, and sheet type identification is performed based on output values obtained when a sensor receives reflected light and transmitted light and a separately measured paper thickness.

In the invention described in Japanese Patent Laid-Open No. 2018-101848, sheet type identification is performed based on collation between a value specified in advance and a value of reflected light/transmitted light or the like obtained using an optical sensor. In this processing, if a sensor output close to the characteristics of a plurality of sheet types is obtained, the specified sheet type may be different from the actual sheet type. In addition, a value that the optical sensor can obtain has a difference because of the individual difference of the sensor or degradation caused by the user's use situation/use period. Hence, in some cases, sufficient identification accuracy cannot be obtained by the sheet type identification method using collation with a value specified in advance.

SUMMARY OF THE INVENTION

The present invention provides a technique of improving a sheet type identification capability.

An identification apparatus according to one aspect of the present invention is an identification apparatus for identifying a type of a sheet, comprising a sensor configured to obtain a plurality of parameters including a parameter concerning a characteristic of the sheet, and an identification unit configured to identify the type of the sheet based on a result of inputting the plurality of parameters obtained by the sensor to an estimation model obtained by machine learning using, as input data, parameters corresponding to the parameters which are obtained by the sensor and include a first parameter and a second parameter classified in accordance with whether a value tends to change due to a predetermined element, and also using, as supervised data, a type of a sheet when the parameters are obtained, wherein the estimation model includes a first partial model to which the first parameter is input and the second parameter is not input, a second partial model to which the second parameter is input and the first parameter is not input, and a third partial model that outputs a result concerning the type of the sheet based on an output from the first partial model and an output from the second partial model.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be (System Arrangement)

Figure 1:
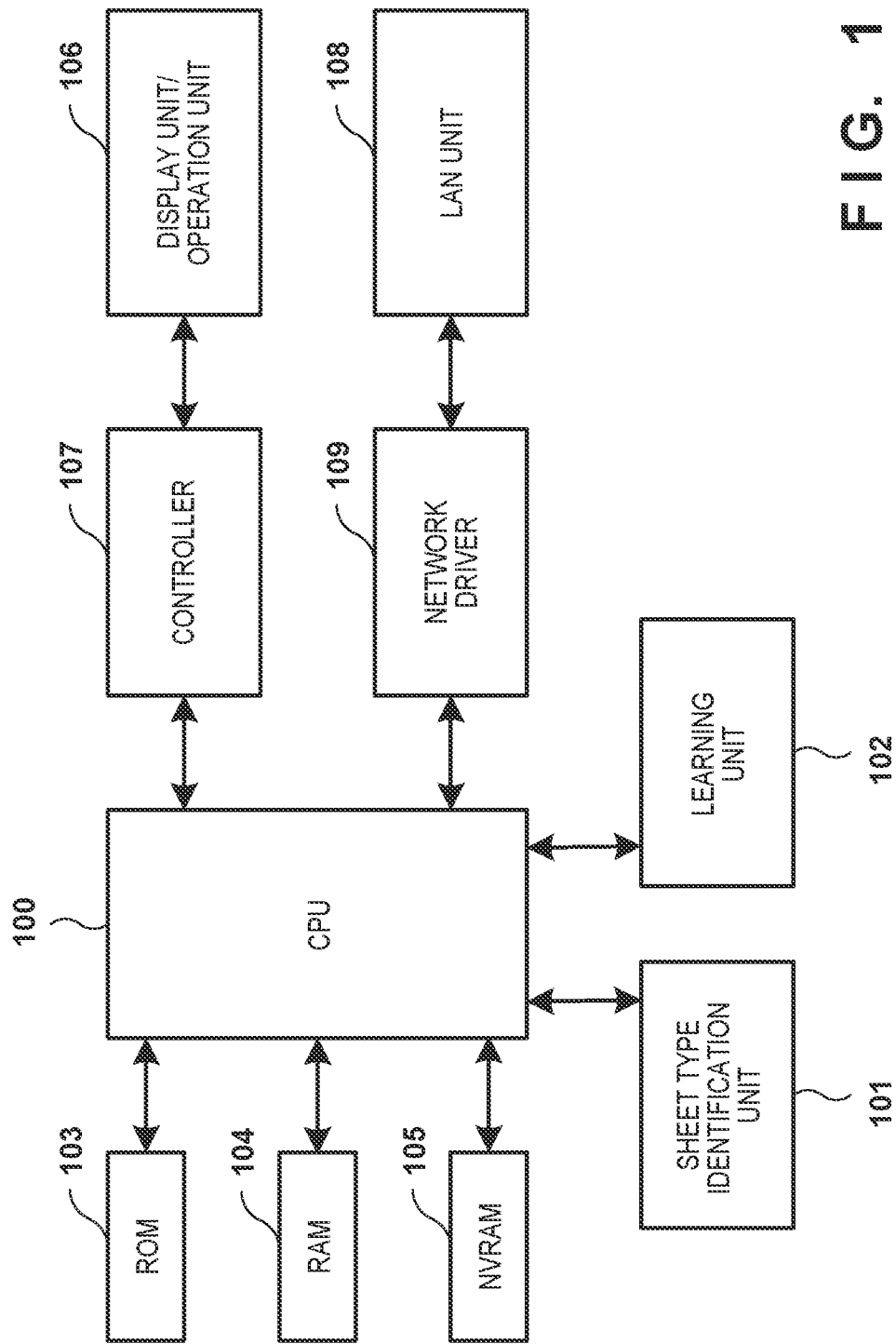
FIG. 1 is a block diagram showing the first arrangement example of a processing system.
Figure 2:
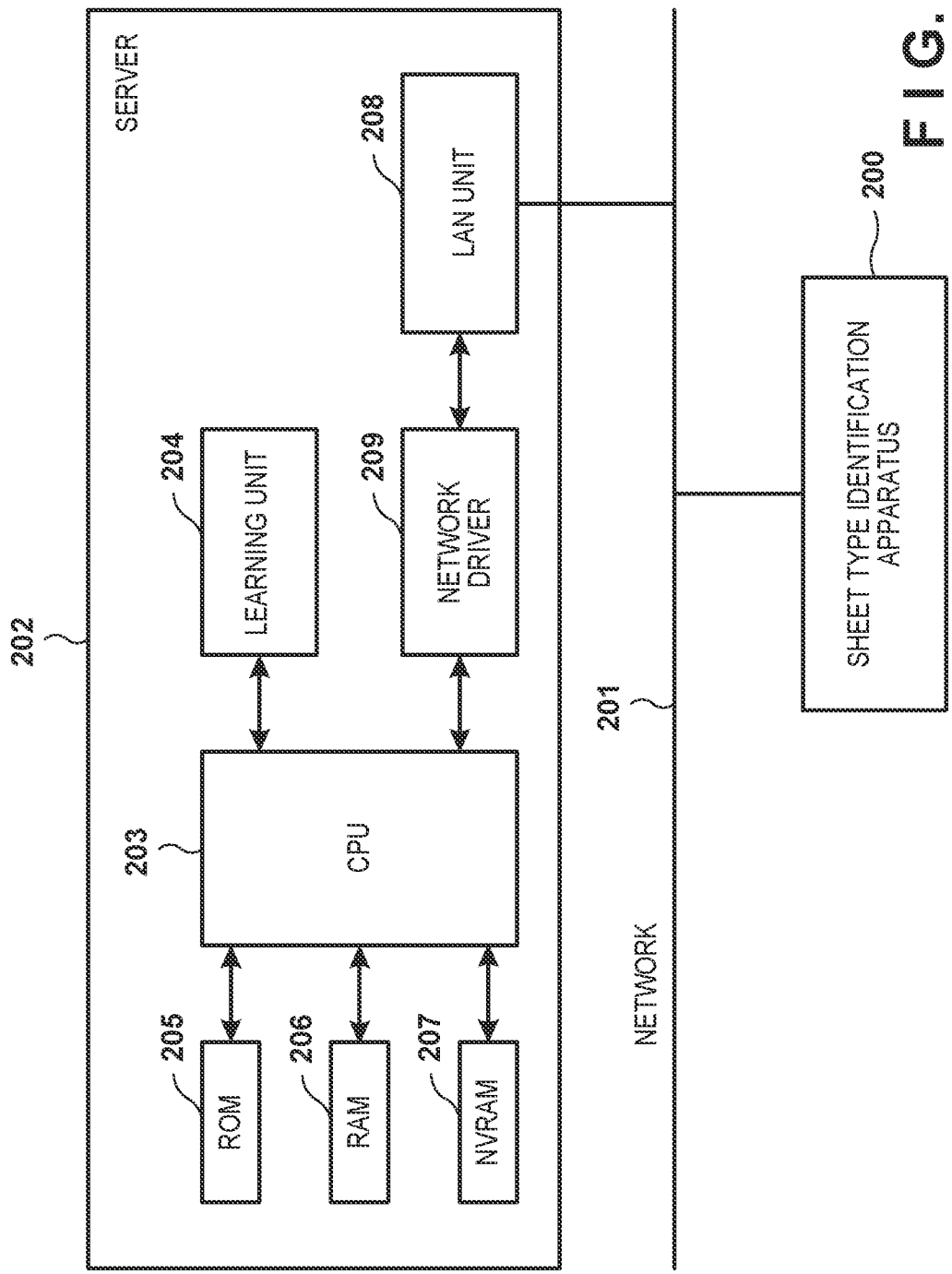
FIG. 2 is a block diagram showing the second arrangement example of the processing system.

An example of a system arrangement according to this embodiment will be described with reference to FIGS. 1 and 2. In this embodiment, machine learning is executed to identify a sheet type, and identification of a sheet type using an estimation model obtained by the machine learning is executed. As an example of the arrangement of a system for such processing, FIG. 1 shows an example in which machine learning and sheet type identification are executed by one apparatus, and FIG. 2 shows an example in which execution of machine learning and sheet type identification is shared by a plurality of apparatuses.

The arrangement of the apparatus in the system arrangement shown in FIG. 1 will be described. Note that this apparatus will be referred to as a sheet type identification apparatus hereinafter for the descriptive convenience, but may be configured to be able to execute processing other than sheet type identification. In this embodiment, the sheet type identification apparatus is provided in a printer. The sheet type identification apparatus identifies a sheet type based on a characteristic value concerning a sheet measured using a sensor included in the sheet conveyance mechanism of the printer, as will be described later. The sheet type identification apparatus includes, for example, a CPU 100, a sheet type identification unit 101, a learning unit 102, a ROM 103, a RAM 104, an NVRAM 105, a display unit/operation unit 106, a controller 107, a LAN unit 108, and a network driver 109. Note that ROM is an acronym for Read Only Memory, RAM is an acronym for Random Access Memory, and NVRAM is an abbreviation for Non Volatile RAM. In addition, LAN is an acronym for Local Area Network. The sheet type identification apparatus may be an apparatus that is provided independently of the printer and can communicate with the printer. A sensor may be provided in the sheet type identification apparatus.

The sheet type identification apparatus executes various kinds of control processing such as control of the entire apparatus and control of sheet type identification processing by, for example, executing a program stored in the ROM 103 or the like by the CPU 100. At this time, the RAM 104 can be used as a work memory in, for example, control. Data that should be held when the sheet type identification apparatus is powered off is held in the NVRAM 105 that is a nonvolatile RAM. The sheet type identification apparatus controls the sheet type identification unit 101 and the learning unit 102 by executing a control program stored in the ROM 103 by the CPU 100. In this case, the RAM 104 holds, for example, data of a result of measuring a sheet as a temporary record. The NVRAM 105 records various kinds of data necessary for maintenance of the sheet type identification apparatus and saves information concerning a sheet, which is used to identify a sheet type. The sheet type identification unit 101 executes sheet type identification processing to identify the type of a sheet based on data of a result of measuring the sheet. The learning unit 102 executes machine learning to obtain an estimation model to be used for sheet type identification processing. The operations of the sheet type identification unit 101 and the learning unit 102 will be described later.

The sheet type identification apparatus displays information on a screen via, for example, the display unit/operation unit 106, and accepts a user operation. Note that display of information can be performed using not only screen display but also various kinds of interfaces such as a sound and a vibration. Acceptance of a user operation is executed via, for example, hardware such as a keyboard, a pointing device, or a touch pad. The display unit/operation unit 106 may be implemented using different pieces of hardware such as a display and a keyboard, or may be implemented by one piece of hardware such as a touch panel. The controller 107 converts, for example, information output by the CPU 100 into a format usable by the display unit/operation unit 106 to generate information presentable to the user, and outputs it to the display unit/operation unit 106. In addition, the controller 107 converts a user operation accepted by the display unit/operation unit 106 into a format processible by the CPU 100, and outputs it to the CPU 100. The execution operation and the setting operation of each function in the sheet type identification apparatus are executed via, for example, the display unit/operation unit 106 and the controller 107.

The sheet type identification apparatus is connected to a network via, for example, the LAN unit 108 and communicates with another apparatus. The network driver 109 extracts data to be handled by the CPU 100 from a signal received via the LAN unit 108, and also converts data output from the CPU 100 into a format to be sent to the network. Note that the LAN unit 108 can include an interface such as a socket for wired communication such as Ethernet® and a circuit for signal processing. The LAN unit 108 may include an antenna for wireless communication such as wireless LAN complying with the IEEE802.11 standard series and a circuit for signal processing. In place of the LAN unit 108, a communication unit for public wireless communication or short distance wireless communication may be provided. Note that when performing the operation of the sheet type identification apparatus via a remote user interface, a control instruction to the sheet type identification apparatus, set value obtainment, and processing result output can be performed via the LAN unit 108 and the network driver 109.

FIG. 2 shows an example of the arrangement of the system in a case in which the learning unit 102 is arranged outside the sheet type identification apparatus. In the example shown in FIG. 2, the system includes a sheet type identification apparatus 200 and a server 202. The sheet type identification apparatus 200 is connected to the server 202 via a network 201, obtains an estimation model that is the result of machine learning by a learning unit 204 in the server 202, and executes sheet type identification processing using the estimation model. Note that the server 202 can be a processing apparatus formed by a general-purpose computer including, for example, a CPU 203, a ROM 205, a RAM 206, and an NVRAM 207. The server 202 controls machine learning processing in the learning unit 204 by, for example, executing a program stored in the ROM 205 by the CPU 203. The sheet type identification apparatus may include a GPU (Graphics Processing Unit) and control machine learning processing in the learning unit 204 using the GPU. The GPU can perform an efficient operation by performing parallel processing of a larger quantity of data. For this reason, when performing learning a plurality of times using a learning model, like deep learning, it is effective that processing is performed by the GPU. More specifically, when executing a learning program including a learning model, learning is performed by cooperatively executing an operation by the CPU 203 and the GPU. Note that an operation concerning processing of the learning unit 204 may be done only by the GPU. An estimation unit 506 and a learning unit 503 to be described with reference to FIGS. 5A and 5B may also use a GPU, like the learning unit 204. Note that the RAM 206 holds data to be used in learning as a temporary record when the server executes control. The NVRAM 207 records various kinds of data necessary for estimation model generation and saves information concerning a sheet, which is used to identify a sheet type. The server 202 can include a LAN unit 208 used to connect, for example, an external apparatus such as the sheet type identification apparatus 200. Note that the LAN unit 208 and a network driver 209 arranged between the LAN unit 208 and the CPU 203 are the same as the LAN unit 108 and the network driver 109 shown in FIG. 1.

Figure 3:
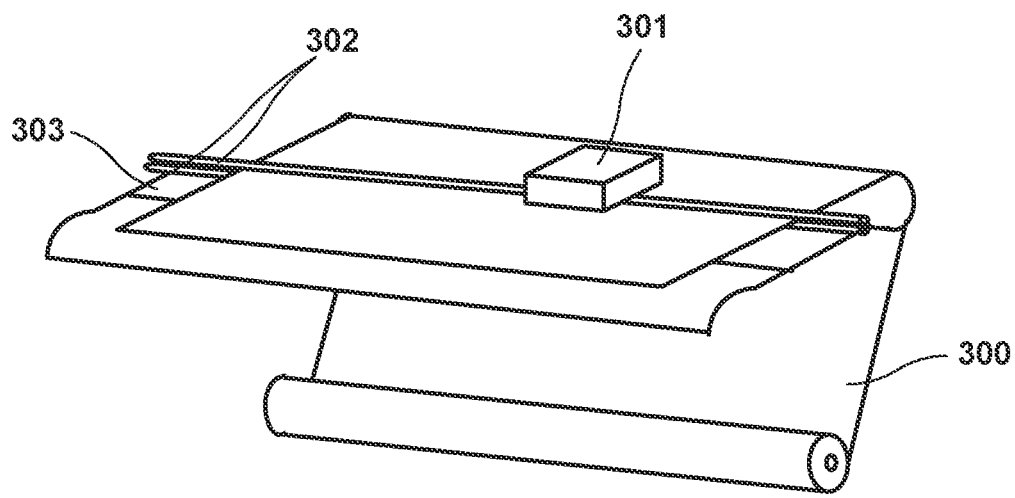
FIG. 3 is a view showing an example of the arrangement of the sheet conveyance mechanism of a printer.

FIG. 3 shows an example of the arrangement of the sheet conveyance mechanism of a printer. In FIG. 3, a sheet 300 that is identification target paper is attached. Note that in the example shown in FIG. 3, the sheet 300 is roll paper. However, the sheet 300 may be cut paper. The sheet 300 is sandwiched by conveyance rollers 302 from the upper and lower sides of the sheet. As the conveyance rollers 302 rotate, the sheet is conveyed. In addition, the sheet 300 is supported from the lower side by a platen 303. The sheet conveyance mechanism further includes a sensor 301, and a value obtained by the sensor 301 is used for sheet type identification processing. Note that the arrangement shown in FIG. 3 is merely an example, and, for example, sheet measurement can be performed by arranging the sensor 301 at an arbitrary position to which the sheet 300 before printing is conveyed.

Figure 4:
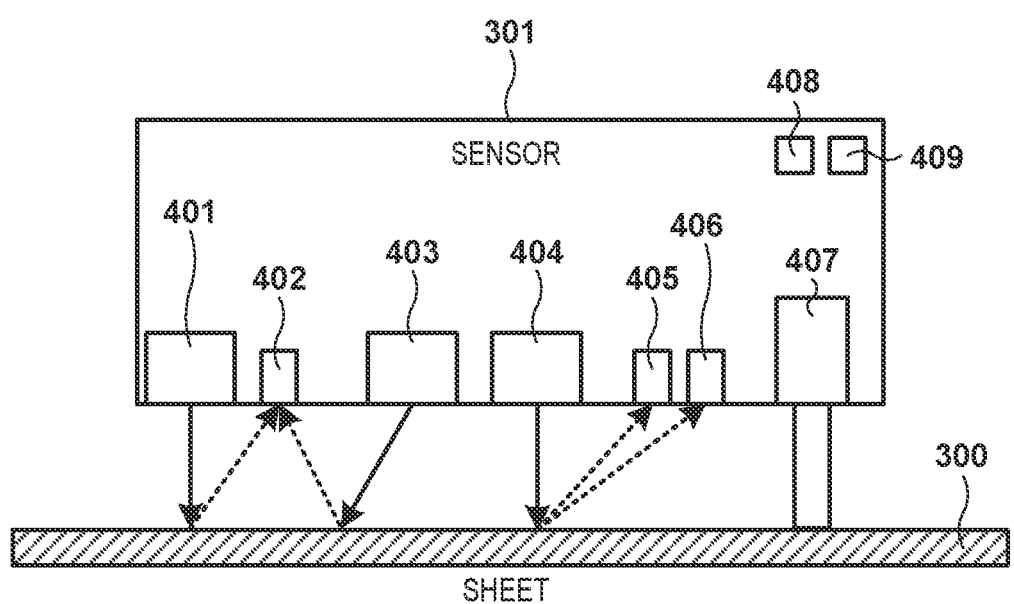
FIG. 4 is a view showing an example of the arrangement of a sensor.

FIG. 4 shows an example of the arrangement of the sensor 301. The sensor 301 includes a plurality of measurement mechanisms configured to obtain information necessary for identifying a sheet type. These measurement mechanisms need not always be mounted in one sensor and may be distributed to a plurality of sensors. The sensor 301 includes, as light emitting elements, for example, a first LED 401, a second LED 403, and a third LED 404. In addition, the sensor 301 includes, as light receiving elements, for example, a first photodiode 402, a second photodiode 405, and a third photodiode 406.

The first LED 401 is, for example, a light source having an illumination angle in a normal direction (90°) with respect to the surface (measurement surface) of the sheet 300. The first photodiode 402 receives, for example, reflected light generated when light with which the first LED 401 has illuminated the sheet 300 is reflected as light from the direction of a first predetermined angle (for example, 45°) with respect to the plane of the sheet 300. That is, in the first photodiode 402, an optical system that detects a diffused reflection component in reflected light generated when the illumination light from the first LED 401 is reflected by the sheet 300 is formed. The second LED 403 is a light source that emits light in a direction that intersects the surface (measurement surface) of the sheet 300 at a second predetermined angle (for example, 60°). The first photodiode 402 receives light from the second predetermined angle in reflected light generated when the illumination light from the second LED 403 is reflected by the sheet 300. Than is, the first photodiode 402 detects a specular reflection component in reflected light generated when the illumination light from the second LED 403 is reflected by the sheet 300.

The third LED 404 is a light source having an illumination angle in a normal direction (90°) with respect to the surface (measurement surface) of the sheet 300. Each of the second photodiode 405 and the third photodiode 406 receives reflected light generated when the illumination light from the third LED 404 is reflected by the sheet 300. Each of the second photodiode 405 and the third photodiode 406 receives light generated when light with which the third LED 404 has illuminated the sheet 300 is reflected. Each of the second photodiode 405 and the third photodiode 406 measures the distance between the sensor 301 and the sheet 300 based on the light receiving amount that changes depending on the distance between the sensor 301 and the sheet 300. For example, the incident angle of reflected light changes depending on the distance between the sensor 301 and the sheet 300. As a result, the light amounts obtained by the second photodiode 405 and the third photodiode 406 change. Because of the positional relationship between the second photodiode 405 and the third photodiode 406, the shorter the distance between the sensor 301 and the sheet 300 is, the larger the difference between the light amounts is. Hence, the distance between the sensor 301 and the sheet 300 can be specified based on the difference between the light amounts obtained by these photodiodes.

Note that in this embodiment, the sensor 301 measures reflected light. However, the sensor 301 may measure transmitted light. Alternatively, diffracted light generated when applying light to the edge of a sheet may be measured. In this embodiment, a case in which a parameter concerning the characteristic of a sheet is obtained by applying light to the sheet will be described. However, the present invention is not limited to this. For example, a sound wave or an ultrasonic wave may be used in place of light, and a parameter concerning a characteristic such as a temperature change that occurs when heated by a heater or the like may be obtained.

The sensor 301 further includes a paper thickness measurement unit 407. The paper thickness measurement unit 407 measures the paper thickness of the sheet 300. Assume here that the paper thickness measurement unit 407 has a mechanism capable of measuring the paper thickness by a method free from aging degradation, such as an optical sensor. For example, the paper thickness measurement unit 407 includes a measuring rod to be pressed against the sheet 300, and can be configured to measure the thickness of the sheet 300 by sandwiching the sheet 300 by the measuring rod and the conveyance mechanism of the sheet 300 or the like. The sensor 301 includes, for example, a thermometer 408 and a hygrometer 409. The thermometer 408 measures the temperature of a room in which the printer is installed, and the hygrometer 409 measures the humidity of the room. Note that only one of the thermometer 408 and the hygrometer 409 may be prepared/used.

(Machine Learning)

Figure 5A:
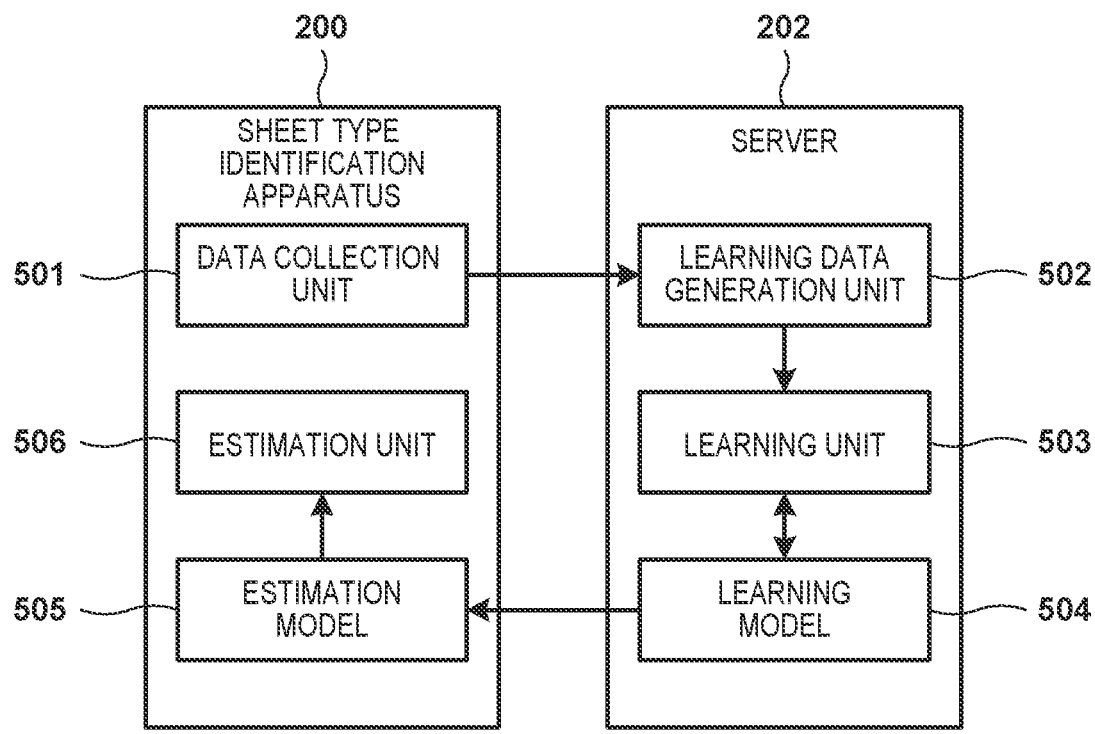
FIG. 5A is a block diagram showing an example of a functional arrangement concerning machine learning in the processing system.

In this embodiment, sheet type identification processing is executed by an estimation model obtained using machine learning. Examples of a functional arrangement concerning this processing will be described here with reference to FIGS. 5A and 5B. FIG. 5A shows an example in which as in the arrangement shown in FIG. 2, machine learning is performed in the server 202, and the sheet type identification apparatus 200 is notified of a generated estimation model and executes sheet type identification processing using the estimation model. In this case, the sheet type identification apparatus 200 includes a data collection unit 501 configured to collect sheet data used to perform machine learning in the server 202, and the estimation unit 506 that identifies a sheet type. In this embodiment, the sheet data collected by the data collection unit 501 include a specular reflection value, a diffused reflection value, and a value of the distance between the sensor 301 and the sheet 300 all of which are obtained from the sensor 301, and values obtained from the paper thickness measurement unit 407, the thermometer 408, and the hygrometer 409 in the sensor 301. The estimation unit 506 performs sheet type identification using an estimation model 505 generated by the server 202. The server 202 includes a learning data generation unit 502 and the learning unit 503. The learning data generation unit 502 analyzes the sheet data obtained by the data collection unit 501 of the sheet type identification apparatus 200. The learning unit 503 executes machine learning using the data analyzed by the learning data generation unit 502, and sequentially updates a learning model 504. The learning model 504 after the learning is completed is transmitted as the estimation model 505 to the sheet type identification apparatus 200.

Figure 5B:
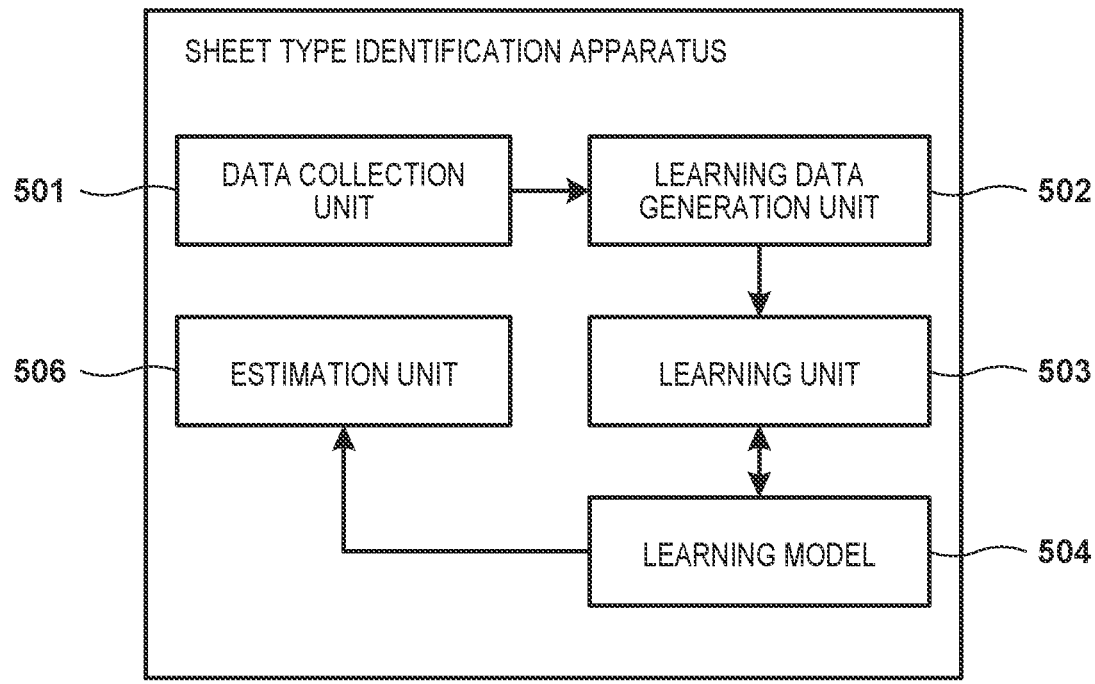
FIG. 5B is a block diagram showing an example of the functional arrangement concerning machine learning in the processing system.

FIG. 5B shows an example in which the sheet type identification apparatus singly performs learning and estimation, as in the arrangement shown in FIG. 1. In this case, the learning data generation unit 502, the learning unit 503, and the learning model 504 are provided in the sheet type identification apparatus. Note that in this system, since the learning model 504 need not be transferred from another apparatus to the sheet type identification apparatus, the estimation model 505 may be omitted. In this case, the sheet type identification apparatus repetitively updates the learning model 504. If it is determined that the learning model 504 can be used as the estimation model 505, the estimation unit 506 estimates a sheet type using the learning model 504 as the estimation model 505.

Figure 6:
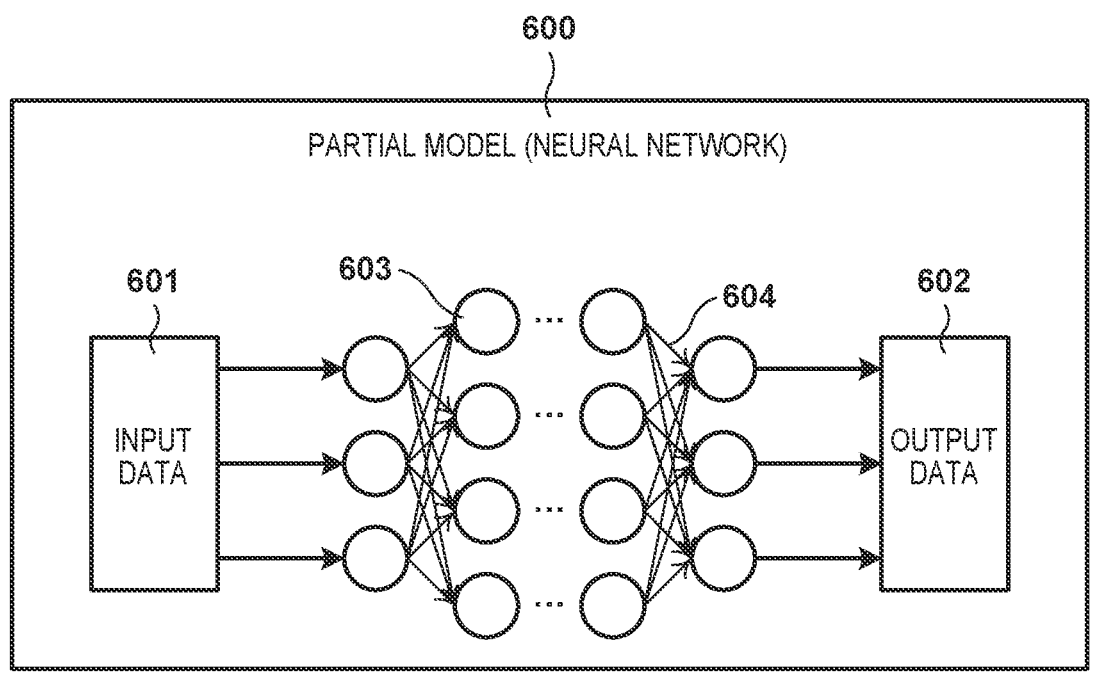
FIG. 6 is a view for explaining the arrangement of a partial model.

Note that in this embodiment, a neural network is used as the learning model 504. FIG. 6 shows a partial model defined as a component of the learning model 504. A partial model 600 includes many nodes 603, and the nodes 603 are associated with each other by branches 604 corresponding to weight coefficients. The weight coefficients corresponding to the branches are optimized, thereby making it possible to extract a feature amount of input data 601. The partial model 600 outputs the feature amount as output data 602. In the sheet type identification processing by the sheet type identification apparatus or the like, two or more partial models 600 can be used in combination. Note that estimation may be performed by one partial model 600.

Figure 7:
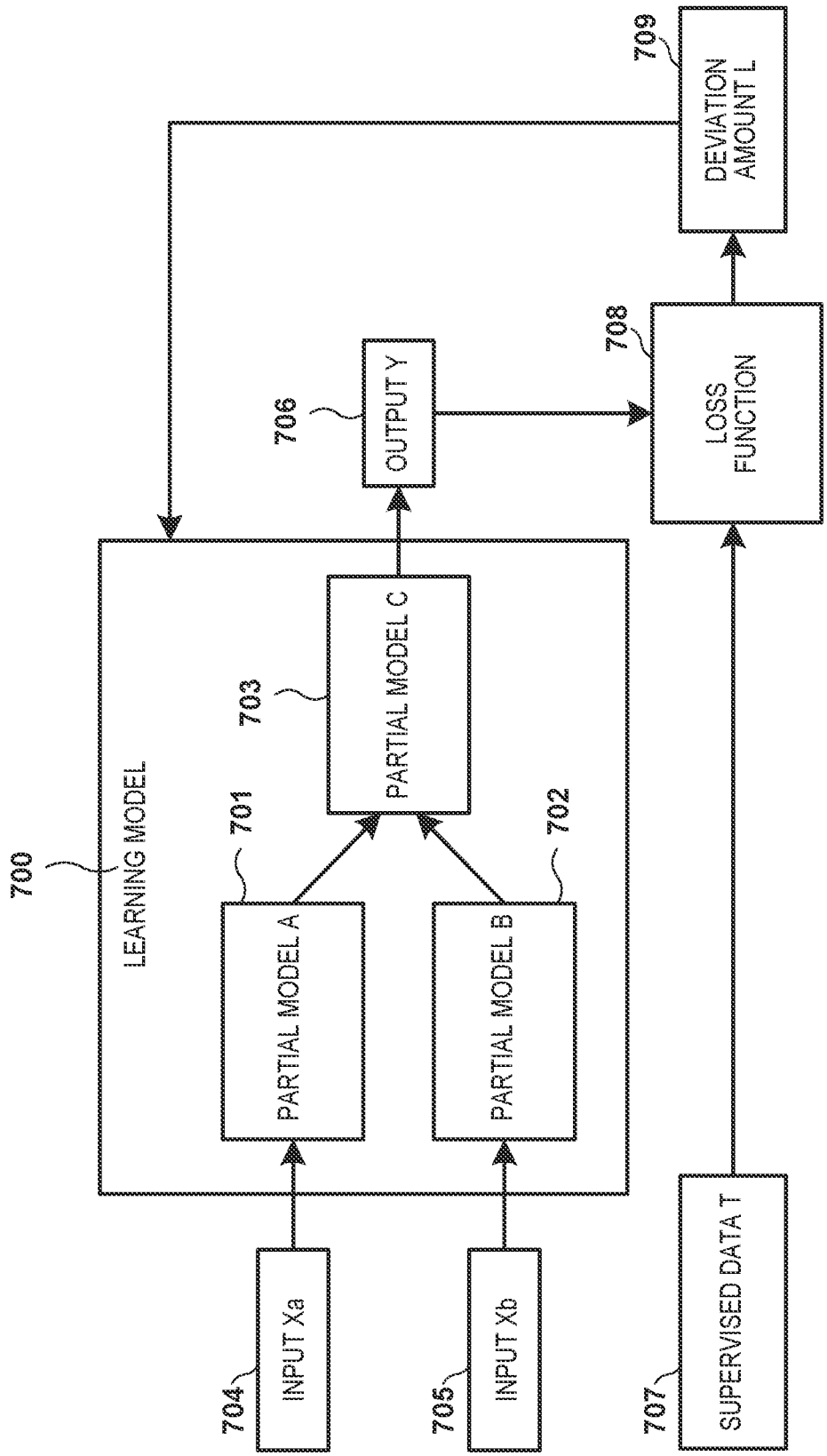
FIG. 7 is a block diagram for explaining the arrangement of input/output when learning a learning model.

FIG. 7 shows the relationship between the learning model at the time of learning and input/output data. In a learning model 700 according to this embodiment, a partial model A 701 that receives input data Xa 704 and a partial model B 702 that receives input data Xb 705 individually output feature amounts. Then, the feature amounts respectively output from the partial model A 701 and the partial model B 702 are input to a partial model C 703, thereby obtaining a final output data Y 706.

The input data Xa 704 includes, for example, values obtained from the photodiodes in the sensor 301 and influenced by the degradation or individual difference of the sensor. On the other hand, the input data Xb 705 includes values obtained from the paper thickness measurement unit 407, the thermometer 408, and the hygrometer 409 in the sensor 301 and not influenced by the degradation or individual difference of the sensor. Since the photodiodes in the sensor 301 change in light receiving amounts when mist of ink attaches to the sensor, the measurement results tend to change earlier than other sensors, that is, the paper thickness measurement unit 407, the thermometer 408, and the hygrometer 409. In this embodiment, a value influenced by the degradation or individual difference of the sensor is a value obtained from the photodiode in the sensor 301. The output from the partial model A 701 and that from the partial model B 702 are input to the partial model C 703. Note that at this time, the output from the partial model A 701 and that from the partial model B 702 may be input as one connected input data to the partial model C 703. The partial model C 703 outputs the output data Y 706 as the final calculation result of the learning model. The output data Y 706 can be expressed as the probability of each sheet type by performing appropriate processing for the value obtained from the partial model C 703. If, for example, identification target sheet types are three types of plain paper, glossy paper, and semi-glossy paper, the output data Y 706 can be output in an expression form such as plain paper: 0.7, glossy paper: 0.2, and semi-glossy paper: 0.1.

At the time of learning, supervised data T 707 is given as correct answer data of the recognition result of the input data Xa 704 and the input data Xb 705. When the output data Y 706 and the supervised data T 707 are given to a loss function 708, a deviation amount L 709 from the correct answer of the recognition result is obtained. The weight coefficients corresponding to the branches between the nodes of the neural network in the learning model 700 are updated using a method such as back propagation such that the deviation amount L 709 becomes small for a large number of learning data. Back propagation is a well-known technique, and a description thereof will be omitted here. Note that in this embodiment, machine learning is performed using, for example, one of algorithms such as a nearest neighbor algorithm, a naive Bayes method, a decision tree method, and a support vector machine. Alternatively, deep learning for generating a feature amount to be learned or a weight coefficient corresponding to a branch by itself using a neural network may be used for machine learning. An algorithm other than these may be used.

Figure 8:
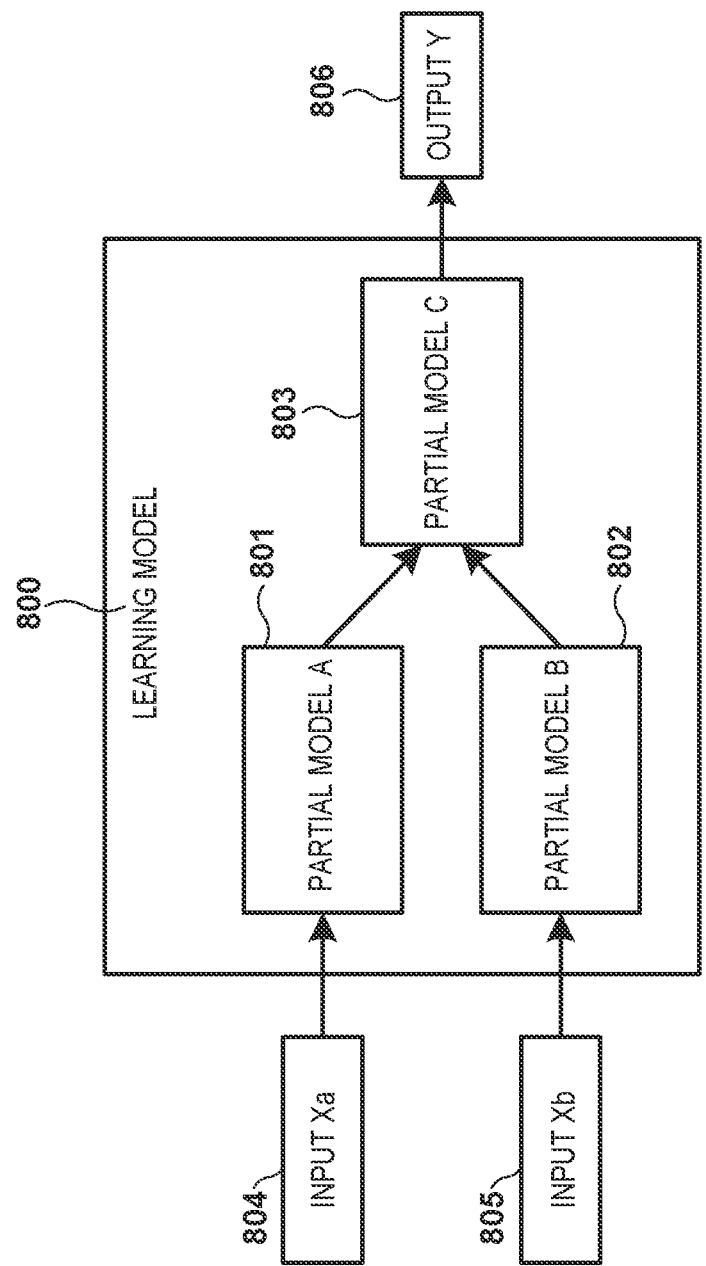
FIG. 8 is a block diagram for explaining the arrangement of input/output when performing inference using a learned model.

FIG. 8 shows the relationship between the estimation model at the time of identification and the input/output data according to this embodiment. An estimation model 800 (a partial model A 801, a partial model B 802, and a partial model C 803) is the learning model 700 (the partial model A 701, the partial model B 702, and the partial model C 703) that is output when, for example, the learning model is stabilized by repeatedly performing machine learning, as shown in FIG. 7. At the time of identification, input data Xa 804 is input to the partial model A 801 and input data Xb 805 is input to the partial model B 802, similar to FIG. 7. An output from the partial model A 801 and that from the partial model B 802 are input to the partial model C 803, thereby outputting final output data Y 806. On the other hand, since it is unnecessary to update the weight coefficients corresponding to the branches in the neural network with respect to the estimation model, the supervised data T 707, the loss function 708, and the deviation amount L 709 of FIG. 7 are not used.

Figure 9:
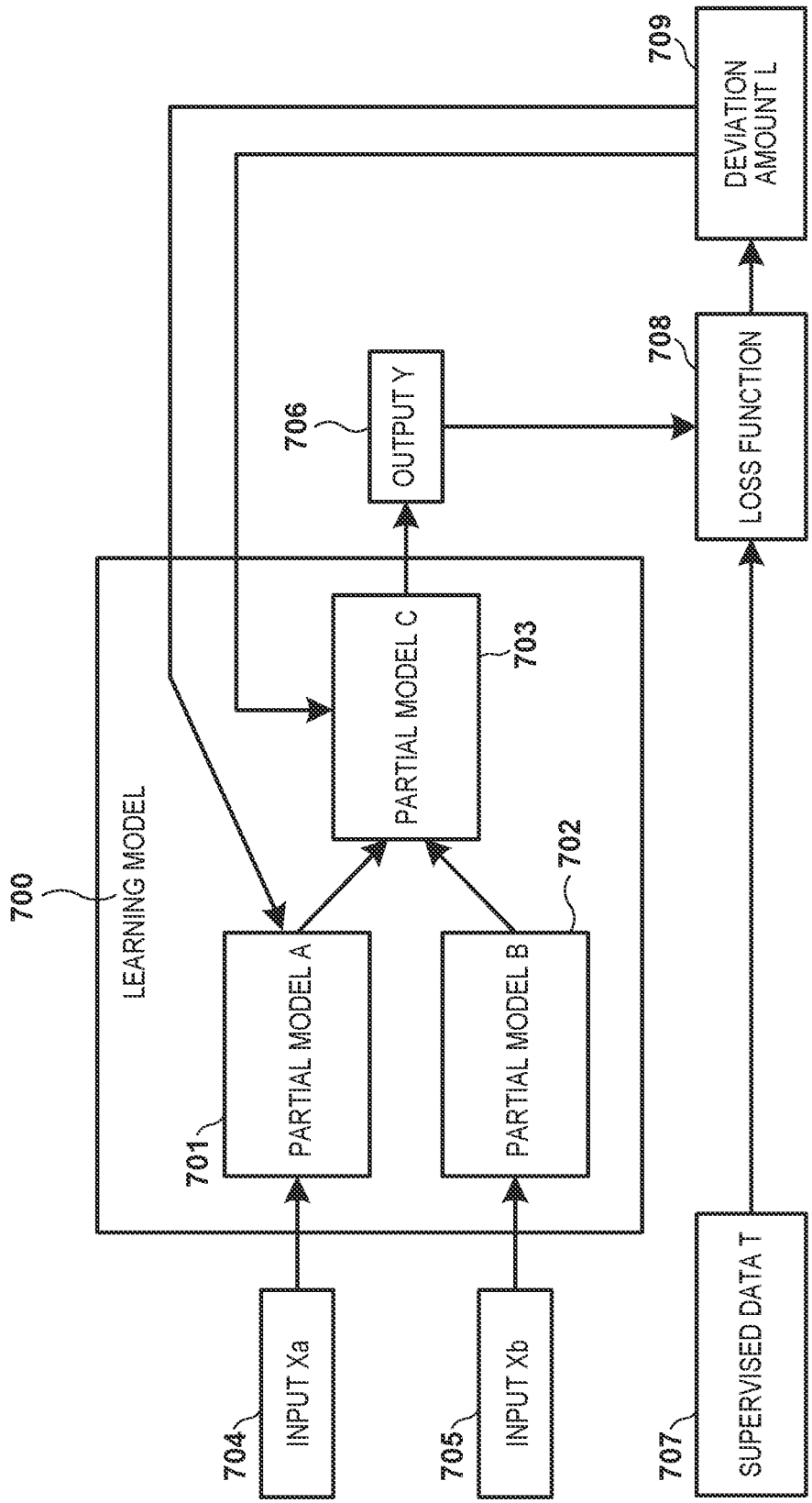
FIG. 9 is a block diagram for explaining the arrangement of input/output when performing additional learning for the learned model.

Additional learning can be performed for the estimation model. That is, additional learning using the supervised data T 707 and the like can be performed for the learning model when it is output as the estimation model. It is possible to improve the accuracy of sheet type identification processing by, for example, performing additional learning when the model in use becomes unsuitable for the state of the printer due to aging degradation of the LED or photodiode. FIG. 9 shows the relationship between the learning model at the time of additional learning and the input/output data.

Processing up to obtaining of the output data Y 706 and the deviation amount L 709 is the same as in FIG. 7. On the other hand, the processing, in which the weight coefficients corresponding to the branches between the nodes of the neural network in the learning model 700 are updated such that the deviation amount L 709 becomes small for a large number of learning data, is different from FIG. 7. That is, at the time of additional learning, learning is performed not for all the partial models included in the learning model 700 but only for the partial model A 701 and the partial model C 703.

No learning is performed for the partial model B 702. This performs additional learning only for a portion influenced by the aging degradation or individual difference of the sensor among the partial models.

Figure 10:
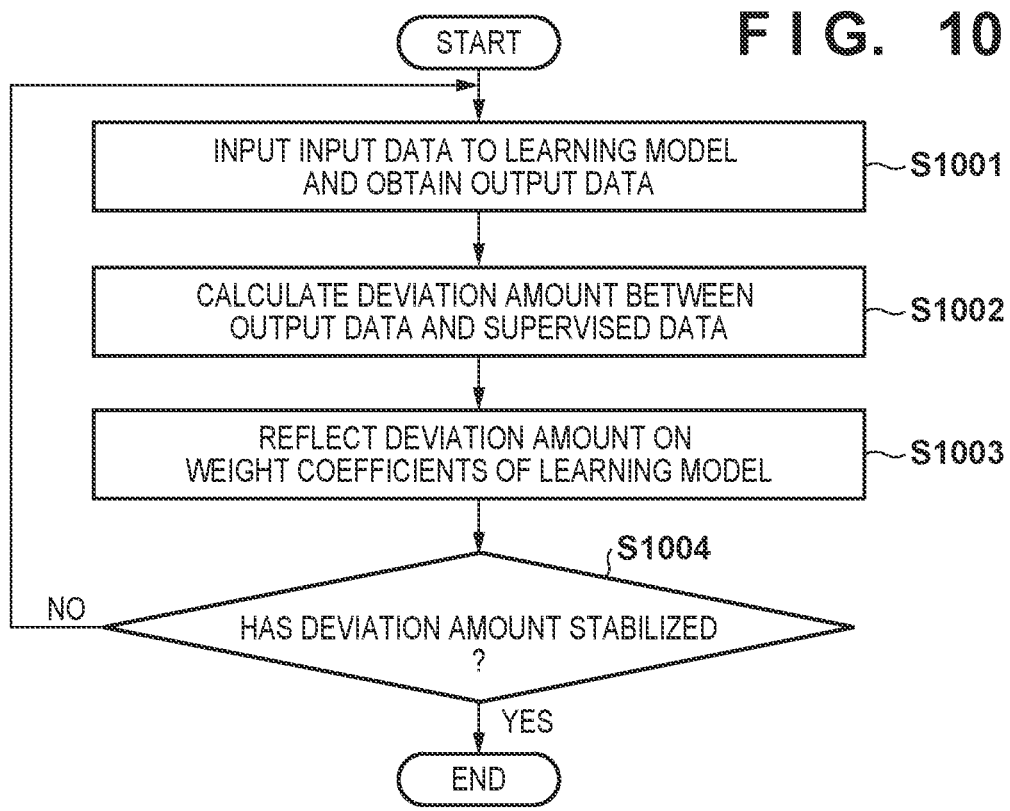
FIG. 10 is a flowchart illustrating an example of the procedure of processing at the time of learning of the learning model.

The procedure of processing at the time of learning of the learning model will be described with reference to FIG. 10. This learning is executed in advance by a learning executor before the user uses the sheet type identification apparatus. The learning executor can be, for example, a producer in an estimation model production process but may be the user himself/herself. Note that if the individual difference of the sensor is not taken into consideration, in an arrangement as shown in FIG. 1, learning is performed in a sheet type identification apparatus included in one printer, and an estimation model obtained by this can be input to one or more other sheet type identification apparatuses. In an arrangement as shown in FIG. 2, learning is executed in another apparatus such as a server connected to a sheet type identification apparatus via a network, and an estimation model obtained by this may be input to the sheet type identification apparatus via the network.

This processing is started when, for example, the learning executor such as the producer who produces the estimation model performs a learning start operation via the user interface of the sheet type identification apparatus or an apparatus for executing learning, such as a server. A description will be made on the assumption that the sheet type identification apparatus executes this processing. However, another apparatus may execute the processing. First, the sheet type identification apparatus inputs input data to the learning model, and obtains output data (step S1001). The learning executor, for example, prepares one or a plurality of printers having the same function as in the above-described embodiment, sets a sheet to be learned, obtains input data by the sensor 301, and inputs the data to learning data, thereby executing learning. At the time of learning, data obtained by measuring a sheet by the sensors 301 in a plurality of printers prepared for estimation model production may be input as input data to one learning data, thereby executing learning.

Next, the sheet type identification apparatus calculates a deviation amount using the output data obtained in step S1001 and supervised data corresponding to the input data (step S1002). If the deviation amount is sufficiently small for many input data, it is determined that sufficient identification performance is obtained. That is, it is possible to discriminate, by the deviation amount, the level of identification performance held by the current learning model. Next, the sheet type identification apparatus reflects the deviation amount on the weight coefficients and the like of the learning model (step S1003). By this processing, the identification performance of the learning model can be improved. Since learning of the learning model is performed by gradually correcting the weight coefficients, the learning executor needs to confirm a learning completion state. To do this, the learning executor always observes the deviation amount, and determines whether the value of the deviation amount has stabilized (step S1004). Note that this determination processing may be automatically performed by the sheet type identification apparatus. For example, the sheet type identification apparatus can calculate, for deviation amounts obtained in a predetermined number of times of most recent learning, an average value or a difference value from a preceding deviation amount, and if the absolute value of the difference value never exceeds a predetermined value, determine that the value of the deviation amount has stabilized. Upon determining that the value of the deviation amount has not stabilized yet (NO in step S1004), the sheet type identification apparatus returns the process to step S1001, and repeats the learning. On the other hand, upon determining that the value of the deviation amount has stabilized (YES in step S1004), the sheet type identification apparatus ends the learning.

Figure 11:
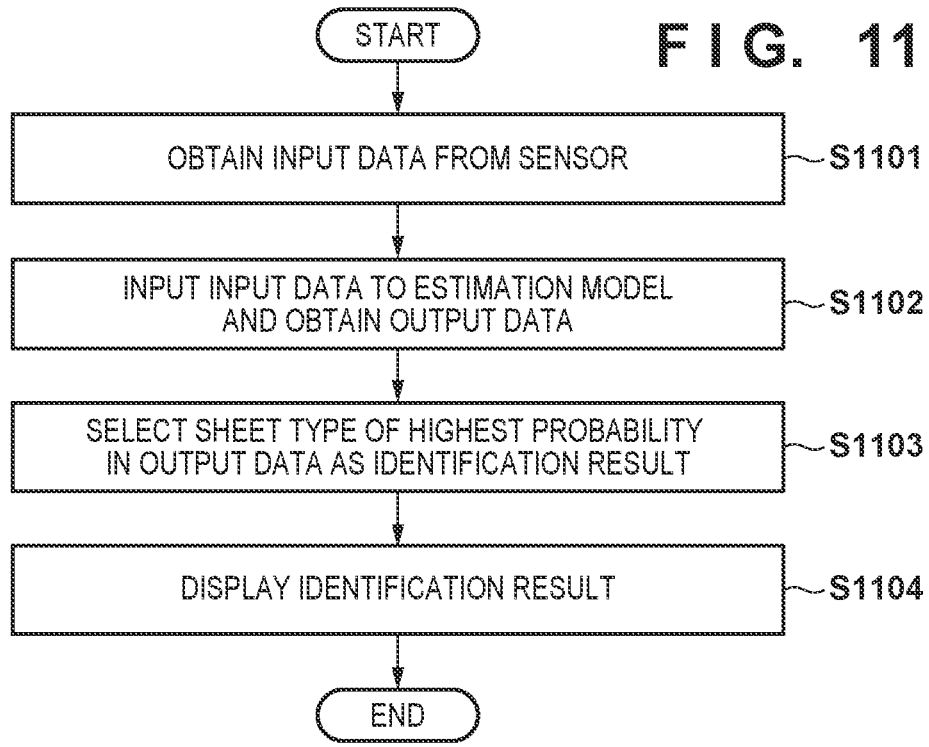
FIG. 11 is a flowchart illustrating an example of the procedure of processing at the time of inference using an estimation model.
Figure 12:
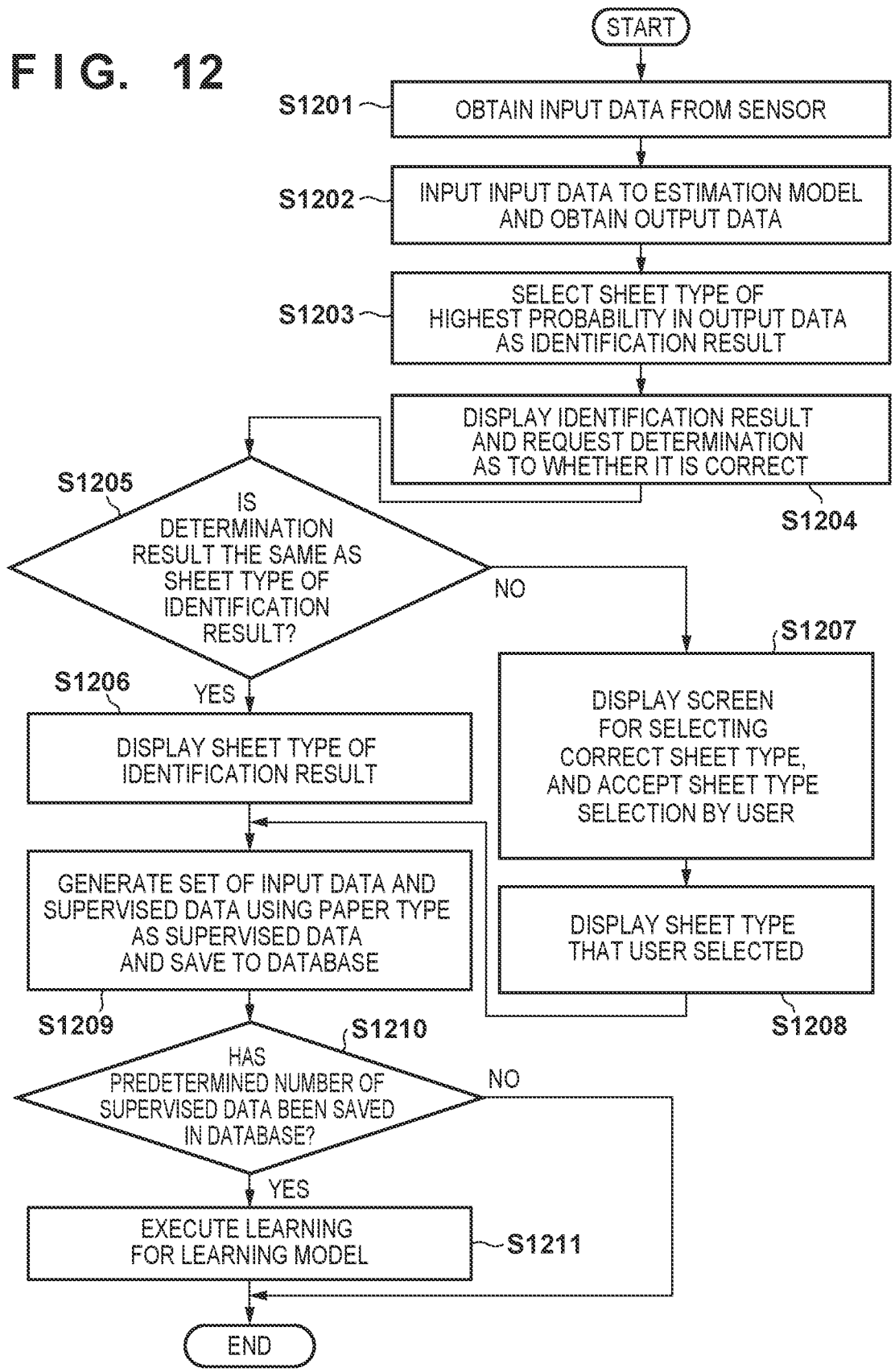
FIG. 12 is a flowchart illustrating an example of the procedure of processing at the time of additional learning for the estimation model.

Processing at the time of inference using the estimation model obtained as described above will be described next with reference to FIGS. 11 and 12. In this embodiment, when determining the sheet type using the estimation model, it is possible to perform additional learning for the estimation model. FIG. 11 is a flowchart of processing at the time of inference when the additional learning function is disabled, and FIG. 12 is a flowchart of processing at the time of inference when the additional learning function is enabled.

The processing shown in FIG. 11 is executed when the sheet type identification apparatus accepts a sheet type identification processing start instruction from the user via a user interface. Alternatively, a sheet is conveyed in the printer before printing or at the time of printing, and the processing shown in FIG. 11 can be executed in accordance with the sensor output at the time of conveyance. In this processing, first, the user sets the sheet of the sheet type identification target in the printer. The sheet type identification apparatus obtains the input data Xa 704 and the input data Xb 705 from the sensor (step S1101). The sheet type identification apparatus inputs the obtained input data to the estimation model, thereby obtaining output data (step S1102). The output data obtained here is a value representing the probability that the identification target sheet is a specific sheet type. Hence, the sheet type identification apparatus selects, as the identification result, the sheet type of the highest probability in the output data (step S1103). Finally, the sheet type identification apparatus displays the identification result on the display unit/operation unit 106 (step S1104), and ends the processing.

Next, processing at the time of additional learning of the learning model will be described with reference to FIG. 12. This processing is performed in parallel to the sheet type identification processing when the additional learning function of the sheet type identification apparatus is enabled. Note that when the additional learning function is disabled, the processing at the time of identification is the processing shown in FIG. 11. This processing is executed when the additional learning function is enabled, the user sets the sheet of the sheet type identification target in the printer, and a sheet type identification processing start instruction is accepted from the user via the user interface. After the start of the processing, processes in steps S1201 to S1203 are the same as those in steps S1101 to S1103 of FIG. 11. Subsequently, the sheet type identification apparatus displays, as the identification result, the sheet type of the highest probability in the obtained output data, and also requests the user to determine whether the identification result is correct (step S1204). That is, to perform additional learning, the sheet type identification apparatus requires the user to input, as supervised data corresponding to the input data, the type of the sheet actually used. The sheet type identification apparatus accepts the user input indicating whether the sheet type displayed as the identification result is correct (step S1205).

If the user input indicating that the sheet type of the identification result is correct is accepted (YES in step S1205), the sheet type identification apparatus displays again the sheet type of the identification result (step S1206), and advances the process to step S1209. Processing in step S1209 will be described later. On the other hand, if the user input indicating that the sheet type of the identification result is incorrect is accepted (NO in step S1205), the sheet type identification apparatus displays a screen for prompting the user to select a correct sheet type, and accepts a sheet type selection by the user (step S1207). Upon accepting the sheet type selection, the sheet type identification apparatus displays the selected sheet type on the screen (step S1208), and advances the process to step S1209. In steps S1209 to S1211, processing for additional learning is executed. The sheet type identification apparatus saves, in a database in the NVRAM 105, the input data and the sheet type selected by the user as the supervised data corresponding to the input data in association with each other (step S1209). In this way, the sheet type identification apparatus accumulates combinations of the input data and the supervised data. The sheet type identification apparatus determines whether the number of accumulated combinations reaches a predetermined number (step S1210). If it is determined that the predetermined number or more of combinations of the input data and the supervised data are saved (YES in step S1210), it can be said that the sheet type identification apparatus can sufficiently collect data for additional learning, and thus performs additional learning for the estimation model currently used (step S1211). As described with reference to FIG. 9, this additional learning makes it possible to learn the change of the measurement result caused by continuous use such as aging degradation and perform determination in accordance with the current state of the sheet type identification apparatus. More specifically, input data is input to the estimation model, as shown in FIG. 9, and a deviation amount is calculated from output data and supervised data. Then, the deviation amount is input to partial models A and C which are influenced by the degradation or individual difference, and the weight coefficients of partial models A and C are updated, thereby performing additional learning. If it is determined that the predetermined number or more of combinations of the input data and the supervised data is not saved (NO in step S1210), the sheet type identification apparatus determines that it cannot sufficiently collect data for additional learning, and ends the processing without performing additional learning. Note that the predetermined number is an integer of 1 or more. However, as a value is sufficiently larger, it is easier to extract features from the supervised data used at the time of learning and reduce noise. Therefore, for example, a sufficiently large value of 100 or more can be used as the predetermined value.

The example in which a combination of input data and supervised data when the user input indicates, in step S1205, that the sheet type of the identification result in step S1203 is correct is also used for additional learning has been described above. However, only a combination of input data and supervised data when the user input indicates that the sheet type of the identification result is incorrect (NO in step S1205) may be used for additional learning. In this case, the input data and the supervised data used to create the estimation model first can also be input to perform additional learning.

Note that when executing the processing shown in FIG. 12, the processes in steps S1209 to S1211 are performed as background processing of the sheet type identification apparatus, and it is thus possible to perform additional learning while continuing printing in the printer, thereby improving the usability. If a server for learning different from the sheet type identification apparatus is used, when the processes in steps S1209 to S1211 are performed by the server, it is possible to perform additional learning while continuing printing in the printer. Note that if the server performs additional learning, a learning model obtained by the additional learning is supplied as an estimation model to the sheet type identification apparatus, and the sheet type identification apparatus replaces the held estimation model by the estimation model having undergone the additional learning.

(Screen Display)

An example of screen display associated with each of the above-described processes will be described below. Note that the following embodiment is merely an example, and a screen other than the following screens can be displayed. Instead of or in addition to screen display, information may be presented to the user using a sound output, a vibration output, lighting of a lamp, or the like.

Figure 13:
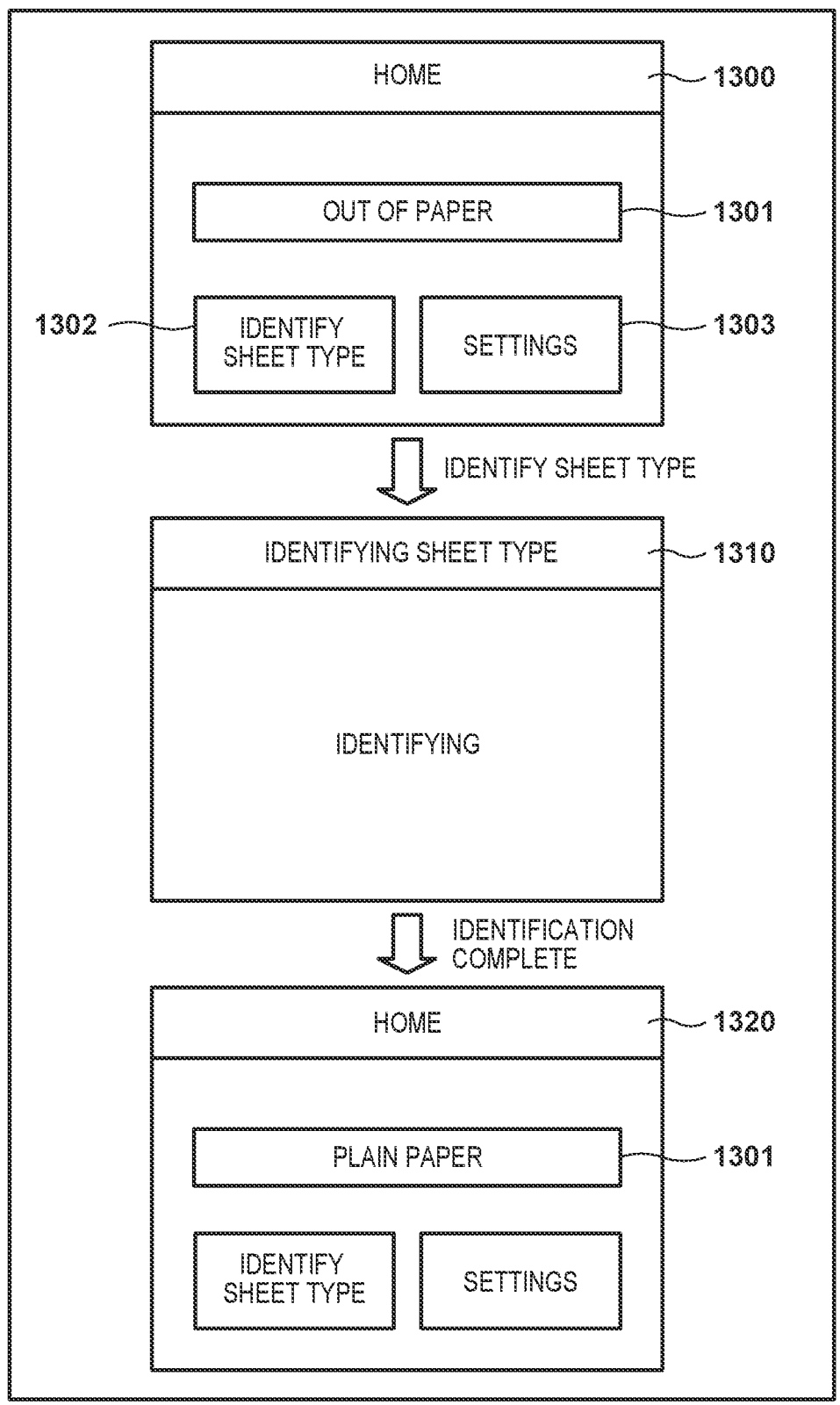
FIG. 13 is a view showing examples of a screen displayed when performing sheet type identification processing using the estimation model.

Examples of a screen displayed on the display unit/operation unit 106 of the sheet type identification apparatus in sheet type identification processing when the additional learning function is disabled will be described with reference to FIG. 13. The sheet type identification apparatus displays a home screen 1300 in a standby state in which no user operation is accepted. Note that if the sheet type identification apparatus is included in the printer, the home screen 1300 is displayed on a display or the like included in the printer. Note that in this case, the home screen 1300 shown in FIG. 13 can be displayed when, for example, a predetermined operation such as pressing of a button for instructing to start sheet type identification processing is performed in a main screen such as a print setting screen. The home screen 1300 includes a sheet type display region 1301 where a sheet type attached to the sheet type identification apparatus is displayed. In addition, the home screen 1300 includes a sheet type identification button 1302 for accepting an execution instruction of processing of identifying a sheet type, and a setting button 1303 for making other settings. In this example, "other settings" include a setting of the additional learning function of the sheet type identification apparatus and settings concerning control of the sheet type identification apparatus such as a setting of a sleep time. If the user attaches a sheet to the sheet type identification apparatus and presses the sheet type identification button 1302, the identification processing shown in FIG. 11 is started. While the identification processing in steps S1101 to S1103 of FIG. 11 is executed, for example, display such as display of a character string "identifying" is performed in a sheet type identification screen 1310 so as to be able to determine that the sheet type identification processing is in progress. Upon completion of the processing in step S1103, the screen is transitioned to the home screen again and a home screen 1320 is displayed in step S1104. At this time, in the sheet type display region 1301, the sheet type ("plain paper" in the example shown in FIG. 13) of the identification result is displayed. If the "sheet type identification" button is pressed in this screen, the identification processing shown in FIG. 11 is started again. The user may be able to change the set sheet type from the screen in which the sheet type of the identification result is displayed.

Figure 14:
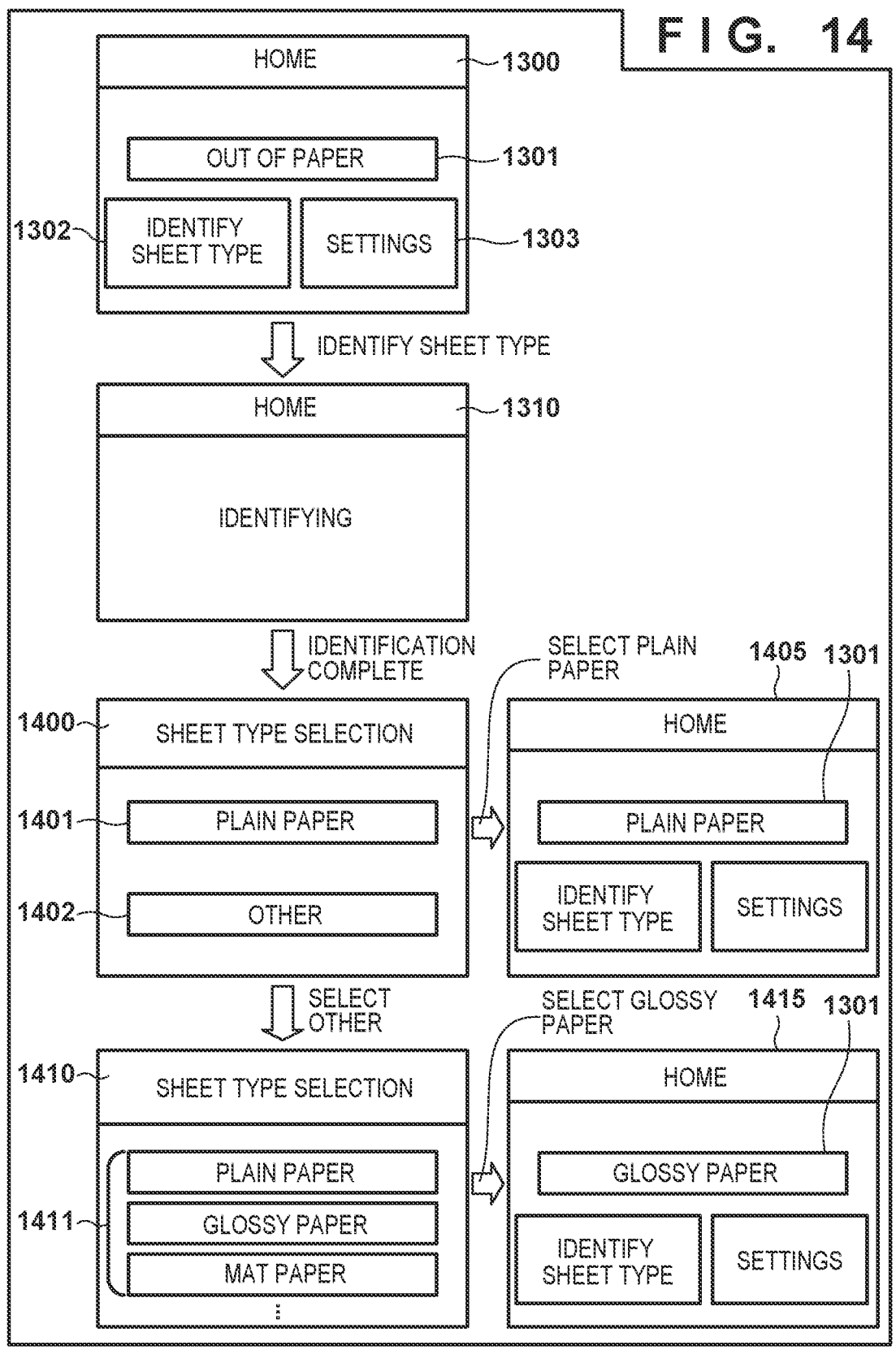
FIG. 14 is a view showing examples of a screen displayed when performing sheet type identification processing in a state in which additional learning is enabled.

FIG. 14 shows examples of a screen displayed when the additional learning function of the sheet type identification apparatus is enabled. Similar to FIG. 13, the home screen 1300 is displayed in the standby state in which no user operation is accepted. When the sheet type identification button 1302 of the home screen 1300 is pressed, the identification processing shown in FIG. 12 is started. When the additional learning function is enabled, to collect learning data, the user needs to determine whether the identification result matches the actual sheet type. To do this, upon completion of identification by the processes in steps S1201 to S1203, the sheet type identification apparatus displays a sheet type selection screen 1400 in step S1204. The sheet type selection screen 1400 includes, for example, an identification result display region 1401 where the result ("plain paper" in the example shown in FIG. 14) of the identification by the sheet type identification apparatus is displayed, and a sheet type selection region 1402 where the user inputs a correct sheet type when the identification result is incorrect. Note that each of the identification result display region 1401 and the sheet type selection region 1402 is displayed in a form of a selectable button. If the user selects the identification result display region 1401, it is determined in step S1205 that the determination result matches the sheet type of the identification result. In step S1206, the screen display is transitioned to a home screen 1405. At this time, the result ("plain paper" in the example shown in FIG. 14) of the identification by the sheet type identification apparatus is displayed in the sheet type display region 1301. On the other hand, if the user selects the sheet type selection region 1402, it is determined in step S1205 that the determination result does not match the sheet type of the identification result. Then, the screen display is transitioned to a sheet type selection screen 1410 for selecting a correct sheet type in step S1207. In this example, specific sheet type selection buttons 1411 corresponding to sheet types are prepared so as to select a sheet type from all the sheet types supported by the sheet type identification apparatus. Note that the sheet types selectable by the specific sheet type selection buttons 1411 can be saved in advance in the NVRAM 105. When the user selects and presses the specific sheet type selection button 1411 corresponding to the correct sheet type from the displayed sheet types, the screen display is transitioned to a home screen 1415 in step S1208. At this time, the sheet type selected by the user is displayed in the sheet type display region 1301. FIG. 14 shows an example in which "glossy paper" is selected, and thus "glossy paper" is displayed in the sheet type display region 1301. Note that when the sheet type display region 1301 is pressed, the sheet type selection screen 1400 can be displayed again.

Figure 15:
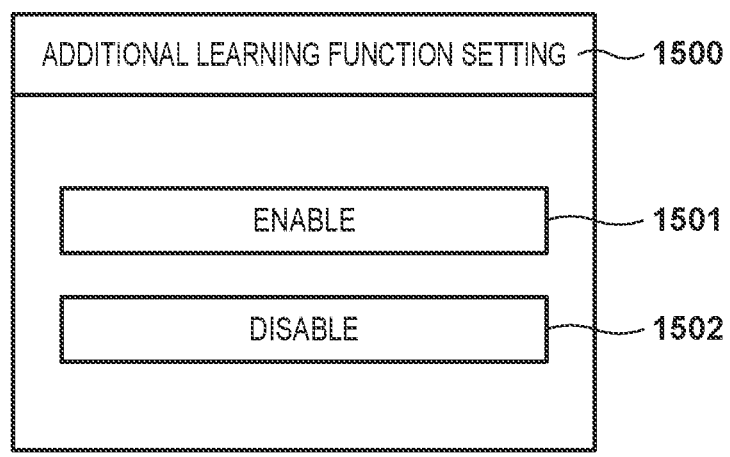
FIG. 15 is a view showing an example of a screen for prompting a user to select enabling/disabling of an additional learning function.

FIG. 15 shows an example of an input screen for selecting enabling/disabling of the additional learning function. The sheet type identification apparatus can prompt the user to select enabling/disabling of the function via an additional learning function setting screen 1500. The identification processing is performed with the setting set before the start of the identification processing. The user can enable the additional learning function by selecting an enable button 1501, and can disable the additional learning function by selecting a disable button 1502.

As described above, the sheet type identification apparatus according to this embodiment executes, for a sheet fed to a printer, the sheet type identification processing using an estimation model obtained by machine learning using, as supervised data, the type of a sheet actually used. This can identify the sheet type more accurately with respect to sheet types whose sheet characteristics are similar to each other and which are conventionally difficult to identify. At the time of learning, the first parameter influenced by the degradation or individual difference of the sensor is input to the first partial model, and the second parameter other than the first parameter is input to the second partial model. This can individually process a characteristic specified by the first parameter and a characteristic specified by the second parameter. As a result, it is possible to obtain an appropriate estimation model in a form considering the differences between the parameters. If, for example, the tendency of the first parameter changes due to aging of the sensor or the like while the second parameter remains the same, it is possible to update the first partial model by additional learning while not updating the second partial model by dividing the model into such partial models. This can prevent the appropriately configured second partial model from being updated unnecessarily to degrade the sheet type identification accuracy. With respect to the partial model for which the tendency of the parameter changes, it is possible to improve the sheet type identification accuracy in accordance with the change of the status by updating the partial model in accordance with the changed tendency.

Note that this embodiment has explained the case in which a partial model concerning a value influenced by the degradation or individual difference of the sensor and a partial model concerning another value are prepared but the present invention is not limited to this. For example, in addition to a partial model concerning a value that strongly tends to be influenced by the degradation or individual difference of the sensor and a partial model concerning a value that strongly tends to be hardly influenced, a partial model concerning another value may be prepared. In this case, "another value" can be a value that tends, not strongly, to change due to the influence of the degradation or individual difference of an apparatus. For example, a value obtained by a sensor that tends to degrade within a short period is set as the first parameter, a value obtained by a sensor (a thermometer or the like) that does not degrade over time is set as the second parameter, and a value obtained by a sensor that degrades in a long period is set as the third parameter. Then, for each of the three or more classified parameters, a partial model can be prepared and used. When additional learning is performed, the update amounts of the weight coefficients with respect to the deviation amount can be changed for each partial model. The magnitudes of the update amounts have, for example, a relationship of the first parameter>the third parameter>the second parameter.

Alternatively, a parameter may be classified in accordance with whether the value tends to change due to the influence of a predetermined element other than the degradation or individual difference, and a partial model may be prepared for each classification. For example, a parameter can be classified in accordance with whether the tendency of the parameter to change due to the influence of the time when the sheet type identification apparatus is used is strong. For example, a parameter can be classified in accordance with whether the tendency of the parameter to change due to the influence of a position at which the sheet type identification apparatus is used is strong.

Note that the example of identifying, when a sheet is conveyed in a printer, the type of the sheet has been described above. The present invention, however, is not limited to this. For example, the above-described sheet type identification apparatus can be applied not only to a print sheet but also to an arbitrary sheet-like object.

According to the present invention, it is possible to improve a sheet type identification capability.

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An identification apparatus for identifying a type of a sheet, the identification apparatus comprising:
   at least one processor; and
   at least one memory that stores computer-readable instructions that, when executed by the at least one processor, cause the at least one processor to:
      obtain, by a sensor, a plurality of parameters including a parameter concerning a characteristic of the sheet; and
      perform an identification process for identify the type of the sheet based on a result of inputting the plurality of parameters obtained by the sensor to an estimator obtained by machine learning using, as input data, parameters corresponding to the parameters that are obtained by the sensor and include a first parameter and a second parameter classified in accordance with whether a value tends to change due to a predetermined element, and also using, as supervised data, a type of a sheet if the parameters are obtained,
   wherein the estimator includes a first part to which the first parameter is input and the second parameter is not input, a second part to which the second parameter is input and the first parameter is not input, and a third part that outputs a result concerning the type of the sheet based on an output from the first part and an output from the second part.

2. The identification apparatus according to claim 1, wherein the computer-readable instructions further cause, when executed by the at least one processor, the at least one processor to perform additional learning for the estimator, and
   wherein the additional learning concerning the first part and the third part is executed, and no additional learning concerning the second part is executed.

3. The identification apparatus according to claim 2, wherein when the type of the sheet identified in the identification process is different from the type of the sheet specified by a user operation of selecting the type of the sheet, the additional learning is performed using, as supervised data, the type of the sheet specified by the user operation.

4. The identification apparatus according to claim 3, wherein a combination of the parameters input for the identification process and the sheet specified by the user operation is saved, and if the number of combinations reaches a predetermined number, the additional learning is performed based on the saved combinations.

5. The identification apparatus according to claim 2, wherein the additional learning is performed based on a user operation of enabling the additional learning, and the additional learning is not performed if a user operation of disabling the additional learning is executed.

6. The identification apparatus according to claim 1, wherein the predetermined element includes one of an individual difference of the sensor and degradation of the sensor.

7. The identification apparatus according to claim 1, wherein the sensor includes a first sensor configured to obtain a parameter indicating a characteristic of reflected light if light is applied to the sheet, and a second sensor different from the first sensor, and
   wherein the first sensor obtains the first parameter, and the second sensor obtains the second parameter.

8. The identification apparatus according to claim 7, wherein the second sensor includes at least one of a thermometer and a hygrometer.

9. The identification apparatus according to claim 1, wherein the first parameter is a parameter having a value that strongly tends to change due to the predetermined element, and the second parameter is a parameter having a value that strongly tends not to change due to the predetermined element.

10. The identification apparatus according to claim 1, wherein the estimator includes a part corresponding to each of at least three parameters classified in accordance with the tendency of a value to change due to the predetermined element.

11. The identification apparatus according to claim 2, wherein the estimator includes a part corresponding to each of at least three parameters classified in accordance with the tendency of a value to change due to the predetermined element, and
   wherein, when executing the additional learning concerning the part, the additional learning is executed by increasing a learning weight for the part into which the parameter whose tendency of the value to change is stronger is classified.

12. A processing apparatus for outputting an estimator for identifying a type of a sheet, the processing apparatus comprising:
   at least one processor; and
   at least one memory that stores computer-readable instructions that, when executed by the at least one processor, cause the at least one processor to:
      generate a learning model by machine learning using, as input data, a plurality of parameters including a parameter concerning a characteristic of the sheet and including a first parameter having a value that tends to change due to a predetermined element and a second parameter having a value that tends not to change due to the predetermined element, and also using, as supervised data, a type of a sheet if the plurality of parameters are obtained; and
      output, as the estimator, the learning model obtained by the machine learning,
   wherein the learning model and the estimator include a first part to which the first parameter is input and the second parameter is not input, a second part to which the second parameter is input and the first parameter is not input, and a third part that outputs a result concerning the type of the sheet based on an output from the first part and an output from the second part.

13. The processing apparatus according to claim 12, wherein additional learning is performed for the estimator.

14. The processing apparatus according to claim 13, wherein the additional learning concerning the first part and the third part is executed, and no additional learning concerning the second part is executed.

15. The processing apparatus according to claim 14, wherein, when the type of the sheet identified using the estimator is different from the type of the sheet specified by a user operation of selecting the type of the sheet, the additional learning is performed using, as supervised data, the type of the sheet specified by the user operation.

16. The processing apparatus according to claim 15, wherein, if the type of the sheet identified using the estimator is different from the type of the sheet specified by the user operation, a combination of the parameters input to the estimator and the sheet specified by the user operation is saved, and if the number of combinations reaches a predetermined number, the additional learning is performed based on the saved combinations.

17. The processing apparatus according to claim 13, wherein the additional learning is performed based on a user operation of enabling the additional learning, and the additional learning is not performed if a user operation of disabling the additional learning is executed.

18. The processing apparatus according to claim 12, wherein the output unit outputs the estimator to an identification apparatus configured to identify the type of the sheet.

19. A processing method executed by an identification apparatus for identifying a type of a sheet, the processing method comprising:
    obtaining, by a sensor, a plurality of parameters including a parameter concerning a characteristic of the sheet; and
    identifying the type of the sheet based on a result of inputting the plurality of parameters obtained by the sensor to an estimator obtained by machine learning using, as input data, parameters corresponding to the parameters that are obtained by the sensor and include a first parameter and a second parameter classified in accordance with whether a value tends to change due to a predetermined element, and also using, as supervised data, a type of a sheet if the parameters are obtained,
    wherein the estimator includes a first part to which the first parameter is input and the second parameter is not input, a second part to which the second parameter is input and the first parameter is not input, and a third part that outputs a result concerning the type of the sheet based on an output from the first part and an output from the second part.

20. A processing method executed by a processing apparatus for outputting an estimator for identifying a type of a sheet, the processing method comprising:
    generating a learning model by machine learning using, as input data, a plurality of parameters including a parameter concerning a characteristic of the sheet and including a first parameter having a value that tends to change due to a predetermined element and a second parameter having a value that tends not to change due to the predetermined element, and also using, as supervised data, a type of a sheet if the plurality of parameters are obtained; and
    outputting, as the estimator, the learning model obtained by the machine learning,
    wherein the learning model and the estimator include a first part to which the first parameter is input and the second parameter is not input, a second part to which the second parameter is input and the first parameter is not input, and a third part that outputs a result concerning the type of the sheet based on an output from the first part and an output from the second part.

21. A non-transitory computer-readable storage medium storing a program for causing a computer, included in an identification apparatus for identifying a type of a sheet, to:
    obtain, by a sensor, a plurality of parameters including a parameter concerning a characteristic of the sheet; and
    identify the type of the sheet based on a result of inputting the plurality of parameters obtained by the sensor to an estimator obtained by machine learning using, as input data, parameters corresponding to the parameters that are obtained by the sensor and include a first parameter and a second parameter classified in accordance with whether a value tends to change due to a predetermined element, and also using, as supervised data, a type of a sheet if the parameters are obtained,
    wherein the estimator includes a first part to which the first parameter is input and the second parameter is not input, a second part to which the second parameter is input and the first parameter is not input, and a third part that outputs a result concerning the type of the sheet based on an output from the first part and an output from the second part.

22. A non-transitory computer-readable storage medium storing a program for causing a computer, included in a processing apparatus for outputting an estimator for identifying a type of a sheet, to:
    generate a learning model by machine learning using, as input data, a plurality of parameters including a parameter concerning a characteristic of the sheet and including a first parameter having a value that tends to change due to a predetermined element and a second parameter having a value that tends not to change due to the predetermined element, and also using, as supervised data, a type of a sheet if the plurality of parameters are obtained; and
    output, as the estimator, the learning model obtained by the machine learning,
    wherein the learning model and the estimator include a first part to which the first parameter is input and the second parameter is not input, a second p-aftial model part to which the second parameter is input and the first parameter is not input, and a third part that outputs a result concerning the type of the sheet based on an output from the first part and an output from the second part.

* * * * *